US012703279B2

(12) United States Patent
Hale et al.

(10) Patent No.: US 12,703,279 B2
(45) Date of Patent: Aug. 11, 2026

(54) CUSHION ASSEMBLY

(71) Applicant: Lear Corporation, Southfield, MI (US)

(72) Inventors: David Hale, Southfield, MI (US); Wu Pan Zagorski, Clawson, MI (US); Samuel Blair, Troy, MI (US); Joshua Hallock, Warren, MI (US)

(73) Assignee: LEAR CORPORATION, Southfield, MI (US)

(*) Notice: Subject to any disclaimer, the term of this patent is extended or adjusted under 35 U.S.C. 154(b) by 494 days.

(21) Appl. No.: 18/087,857

(22) Filed: Dec. 23, 2022

(65) Prior Publication Data

US 2024/0208798 A1 Jun. 27, 2024

(51) Int. Cl.
*B60N 2/58* (2006.01)
*B68G 7/05* (2006.01)

(52) U.S. Cl.
CPC ............. *B60N 2/5866* (2013.01); *B68G 7/05* (2013.01)

(58) Field of Classification Search
CPC ...... B60N 2/5866; B60N 2/5825; B60N 2/00; A47C 27/12; B32B 5/26; B68G 7/05
USPC .......................... 297/452.58, 452.61, DIG. 2
See application file for complete search history.

(56) References Cited

U.S. PATENT DOCUMENTS 1,621,008 A 3/1927 Fricker
2,130,935 A 9/1938 Thompson
2,188,995 A 2/1940 Avery et al.
2,630,938 A 3/1953 Burnett
2,630,968 A 3/1953 Muskat
3,059,251 A * 10/1962 Pollock ................ A47C 27/122 297/DIG. 2
3,155,363 A 11/1964 Lohr
3,309,052 A 3/1967 Borisof
3,315,283 A 4/1967 Larsen
3,630,572 A 12/1971 Homier
3,689,620 A 9/1972 Miyasaki et al.
3,733,658 A 5/1973 Mitchell
3,861,747 A 1/1975 Diamond
D239,147 S 3/1976 Karlsen
3,961,823 A 6/1976 Caudill, Jr.
4,031,579 A 6/1977 Larned et al.
4,287,657 A 9/1981 Raymond
4,396,823 A 8/1983 Nihei et al.
4,476,594 A 10/1984 Mcleod
4,563,387 A 1/1986 Takagi et al.
(Continued)

FOREIGN PATENT DOCUMENTS

AU 2006227668 A1 9/2006
AU 2003296088 B2 9/2008
(Continued)

OTHER PUBLICATIONS airstring.com, About Airstring, Jan. 18, 2021, 13 pages.
(Continued)

*Primary Examiner* — Milton Nelson, Jr.
(74) *Attorney, Agent, or Firm* — ALSTON & BIRD LLP

(57) ABSTRACT

An assembly is provided with a unitary mesh of expanded thermoplastic resin strands with a cavity formed therein. A trim component or a support member is oriented at least partially within the cavity. A weld is formed at least partially along the mesh adjacent to the cavity to retain the trim component or the support member within the cavity.

13 Claims, 3 Drawing Sheets

(56) References Cited

U.S. PATENT DOCUMENTS 4,648,934 A * 3/1987 Kiss ........................ B27N 5/02
425/374
4,663,211 A 5/1987 Kon
4,751,029 A 6/1988 Swanson
4,786,351 A 11/1988 Elliott et al.
4,859,516 A 8/1989 Yamanaka et al.
4,860,402 A 8/1989 Dichtel
4,876,135 A 10/1989 McIntosh
4,881,997 A 11/1989 Hatch
4,900,377 A 2/1990 Redford et al.
4,913,757 A 4/1990 Yamanaka et al.
4,933,224 A 6/1990 Hatch
4,952,265 A 8/1990 Yamanaka et al.
4,953,770 A 9/1990 Bond, Sr.
5,003,664 A 4/1991 Wong
5,007,676 A 4/1991 Lien
5,016,941 A 5/1991 Yokota
5,092,381 A 3/1992 Feijin et al.
5,095,592 A 3/1992 Doerfling
5,313,034 A * 5/1994 Grimm ............... B29C 66/8362
219/777
5,378,296 A 1/1995 Vesa
5,381,922 A 1/1995 Gladman et al.
5,405,178 A 4/1995 Weingartner et al.
D364,269 S 11/1995 Sabosky
5,464,488 A 11/1995 Servin
5,464,491 A 11/1995 Yamanaka
5,482,665 A 1/1996 Gill
5,492,662 A 2/1996 Kargol et al.
5,494,627 A 2/1996 Kargol et al.
5,536,341 A 7/1996 Kelman
5,551,755 A 9/1996 Lindberg
5,569,641 A 10/1996 Smith
5,586,807 A 12/1996 Taggart
5,587,121 A 12/1996 Vesa
5,605,373 A 2/1997 Wildern, IV et al.
5,620,759 A 4/1997 Insley et al.
5,622,262 A 4/1997 Sadow
5,639,543 A 6/1997 Isoda et al.
5,669,129 A 9/1997 Smith et al.
5,669,799 A 9/1997 Moseneder et al.
5,679,296 A 10/1997 Kelman et al.
5,733,825 A 3/1998 Martin et al.
5,788,332 A 8/1998 Hettinga
5,811,186 A 9/1998 Martin et al.
5,819,408 A 10/1998 Catlin
5,833,321 A 11/1998 Kim et al.
5,966,783 A 10/1999 Genereux et al.
6,010,766 A 1/2000 Braun et al.
6,057,024 A 5/2000 Mleziva et al.
6,063,317 A 5/2000 Carroll, III
6,131,220 A 10/2000 Morimura
6,272,707 B1 8/2001 Robrecht et al.
6,283,552 B1 9/2001 Halse et al.
6,302,487 B1 10/2001 Fujita et al.
6,347,790 B1 2/2002 Nishibori et al.
6,378,150 B1 4/2002 Minegishi et al.
D461,746 S 8/2002 Olson et al.
6,457,218 B1 10/2002 Lawrence
6,558,590 B1 5/2003 Stewart
6,668,429 B2 12/2003 Fujisawa et al.
6,766,201 B2 7/2004 Von Arx et al.
6,776,201 B2 8/2004 Willis
6,918,146 B2 7/2005 England
D523,330 S 6/2006 Mattesky
7,073,230 B2 7/2006 Boville
7,100,978 B2 9/2006 Ekern et al.
D530,192 S 10/2006 Becerra
7,128,371 B2 10/2006 Kawasaki et al.
7,141,768 B2 11/2006 Malofsky et al.
7,158,968 B2 1/2007 Cardno
D538,704 S 3/2007 Kaminski
7,290,300 B1 11/2007 Khambete
7,377,762 B2 5/2008 Nishibori et al.
7,427,103 B2 9/2008 Weber et al.
7,481,489 B2 1/2009 Demick
7,506,939 B2 3/2009 Borckschneider et al.
7,547,061 B2 6/2009 Horimatsu et al.
7,549,707 B2 6/2009 Brennan et al.
7,622,179 B2 11/2009 Patel
7,625,629 B2 12/2009 Takaoka
7,669,925 B2 3/2010 Beck et al.
7,707,743 B2 5/2010 Schindler et al.
7,771,375 B2 8/2010 Nishibori et al.
7,837,263 B2 11/2010 Booth et al.
7,866,969 B2 1/2011 Ruiz et al.
7,892,991 B2 2/2011 Yamanaka et al.
D636,293 S 4/2011 Dolce et al.
7,946,649 B2 5/2011 Galbreath et al.
7,993,734 B2 8/2011 Takaoka
8,052,212 B2 11/2011 Backendorf
8,056,263 B2 11/2011 Schindler et al.
8,226,882 B2 7/2012 Takaoka
8,235,462 B2 8/2012 Bajic et al.
8,240,759 B2 8/2012 Hobl et al.
8,276,235 B2 10/2012 Naughton
8,277,210 B2 10/2012 Takaoka
D677,193 S 3/2013 MacDonald
8,563,121 B2 10/2013 Takaoka
8,563,123 B2 10/2013 Takaoka
8,568,635 B2 10/2013 Takaoka
8,721,825 B2 5/2014 Takaoka
8,752,902 B2 6/2014 Labish
8,757,996 B2 6/2014 Takaoka
8,828,293 B2 9/2014 Takaoka
8,882,202 B2 11/2014 Petzel et al.
8,932,692 B2 1/2015 Pearce
9,004,591 B2 4/2015 Murasaki et al.
9,009,792 B1 4/2015 Scofield et al.
9,097,921 B2 8/2015 Ogasawara
9,168,854 B2 10/2015 Ursino et al.
9,169,585 B2 10/2015 Takaoka
9,174,404 B2 11/2015 Takaoka
9,179,748 B2 11/2015 Esti
9,194,066 B2 11/2015 Takaoka
9,283,875 B1 3/2016 Pellettiere
9,334,593 B2 5/2016 Sasaki
9,434,286 B2 9/2016 Klusmeier et al.
9,440,390 B2 9/2016 Takaoka
9,447,522 B2 9/2016 Zikeli et al.
9,456,702 B2 10/2016 Miyata et al.
9,487,117 B2 11/2016 Steinmeier et al.
9,528,209 B2 12/2016 Takaoka
9,561,612 B2 2/2017 Takaoka
9,598,803 B2 3/2017 Takaoka
9,615,670 B2 4/2017 Takaoka
9,616,790 B2 4/2017 Stankiewicz et al.
9,617,021 B2 4/2017 McCorkle et al.
9,669,744 B2 6/2017 Cao et al.
9,688,007 B2 6/2017 Cheng
9,708,067 B2 7/2017 Wilson et al.
9,751,442 B2 9/2017 Smith
9,771,174 B2 9/2017 Murray
D798,875 S 10/2017 Huang
9,789,796 B1 10/2017 White
9,918,559 B2 3/2018 Osaki
9,918,560 B2 3/2018 Osaki
9,925,899 B2 3/2018 Mogi et al.
9,938,649 B2 4/2018 Taninaka et al.
9,970,140 B2 5/2018 Taninaka et al.
10,118,323 B2 11/2018 Fujita et al.
10,150,320 B2 12/2018 Ellringmann et al.
10,231,511 B2 3/2019 Guyan et al.
10,233,073 B2 3/2019 Takaoka
10,266,977 B2 4/2019 Takaoka
10,316,444 B2 6/2019 Wakui et al.
10,328,618 B2 6/2019 Takaoka
10,343,565 B2 7/2019 Baek et al.
10,398,236 B2 9/2019 Achten et al.
10,399,848 B2 9/2019 Kristo et al.
10,414,305 B2 9/2019 Ishii et al.
10,421,414 B2 9/2019 Townley et al.
10,457,175 B2 10/2019 Lang et al.
10,501,598 B2 12/2019 Baldwin et al.

(56) References Cited

U.S. PATENT DOCUMENTS 10,604,040 B2 3/2020 Clauser et al.
10,618,799 B2 4/2020 Shah et al.
10,632,814 B2 4/2020 Humer
10,730,419 B2 8/2020 Low et al.
10,736,435 B2 8/2020 Duncan et al.
10,744,914 B2 8/2020 Baek et al.
10,750,820 B2 8/2020 Guyan
RE48,225 E 9/2020 Kheil et al.
10,780,805 B2 9/2020 Kamata
10,806,272 B2 10/2020 Ando et al.
10,821,862 B2 11/2020 Russman et al.
10,843,600 B2 11/2020 Booth et al.
10,882,444 B2 1/2021 Townley et al.
10,889,071 B2 1/2021 Kojima et al.
D909,792 S 2/2021 Pound
10,934,644 B2 3/2021 Taninaka et al.
11,007,761 B2 5/2021 Ben-Daat et al.
11,168,421 B2 11/2021 Wakui et al.
11,186,336 B2 11/2021 Primeaux et al.
D948,764 S 4/2022 Peterson
11,369,532 B2 6/2022 Wilson et al.
11,383,625 B2 7/2022 Voigt et al.
11,554,699 B2 1/2023 Liau et al.
D1,005,380 S 11/2023 McWilliams et al.
11,807,143 B2 * 11/2023 Webster ............... B60N 2/7035
2002/0041949 A1 4/2002 Nishibori et al.
2002/0101109 A1 8/2002 Stiller et al.
2002/0193221 A1 12/2002 Tisi
2003/0026970 A1 2/2003 Hernandez et al.
2003/0032731 A1 2/2003 Oswald et al.
2003/0061663 A1 4/2003 Lampel
2003/0092335 A1 5/2003 Takaoko
2004/0036326 A1 2/2004 Bajic et al.
2004/0099981 A1 5/2004 Gerking
2004/0126577 A1 7/2004 Lee et al.
2004/0142619 A1 7/2004 Ueno et al.
2004/0255385 A1 12/2004 England
2005/0030011 A1 2/2005 Shimizu et al.
2005/0066423 A1 3/2005 Hogan
2005/0198874 A1 9/2005 Wurm
2005/0238842 A1 10/2005 Schindzielorz et al.
2006/0068120 A1 3/2006 Sreenivasan et al.
2006/0075615 A1 4/2006 Khambete
2006/0116045 A1 6/2006 Nishibori et al.
2006/0141221 A1 6/2006 Sasaki
2006/0198983 A1 9/2006 Patel
2006/0237986 A1 10/2006 Brockschneider et al.
2007/0001336 A1 1/2007 Nishibori et al.
2007/0057414 A1 3/2007 Hartge
2007/0066197 A1 3/2007 Woo et al.
2007/0134464 A1 6/2007 Schindzielorz et al.
2007/0207691 A1 9/2007 Cobbett Wiles et al.
2008/0018162 A1 1/2008 Galbreath et al.
2008/0048474 A1 2/2008 Pedde et al.
2008/0099458 A1 5/2008 Hilmer
2008/0102149 A1 5/2008 Williams
2008/0203615 A1 8/2008 Brum
2008/0252111 A1 10/2008 Rothkop et al.
2008/0254281 A1 10/2008 Chen et al.
2008/0309143 A1 12/2008 Booth et al.
2009/0008377 A1 1/2009 Nathan et al.
2009/0085384 A1 4/2009 Galbreath et al.
2009/0108494 A1 4/2009 Ito et al.
2009/0127912 A1 5/2009 Galbreath et al.
2009/0152909 A1 6/2009 Andersson
2009/0191779 A1 7/2009 Cree et al.
2009/0269570 A1 10/2009 Takaoka
2009/0269571 A1 10/2009 Takaoka
2009/0311495 A1 12/2009 Squires et al.
2010/0181796 A1 7/2010 Galbreath et al.
2010/0258334 A1 10/2010 Akaike et al.
2011/0252568 A1 10/2011 Ramp et al.
2011/0278902 A1 11/2011 Galbreath et al.
2011/0316185 A1 12/2011 Takaoka
2012/0042452 A1 2/2012 Takaoka
2012/0104646 A1 5/2012 Takaoka
2012/0112515 A1 5/2012 Labish
2012/0174352 A1 7/2012 Tsunoda
2012/0180939 A1 7/2012 Takaoka
2012/0181841 A1 7/2012 Petzel et al.
2012/0235461 A1 9/2012 Rosenbrock et al.
2012/0301701 A1 11/2012 Takaoka
2012/0319323 A1 12/2012 Takaoka
2012/0328722 A1 12/2012 Takaoka
2013/0000043 A1 1/2013 Bullard et al.
2013/0020016 A1 1/2013 Takaoka
2013/0137330 A1 5/2013 Grimm
2013/0161858 A1 6/2013 Sasaki
2013/0164123 A1 6/2013 Helmenstein
2013/0189472 A1 7/2013 Takaoka
2013/0200661 A1 8/2013 Klusmeier et al.
2014/0029900 A1 1/2014 Logan, Jr. et al.
2014/0035191 A1 2/2014 Takaoka et al.
2014/0037907 A1 2/2014 Takaoka
2014/0037908 A1 2/2014 Takaoka
2014/0042792 A1 2/2014 Kajiwara
2014/0062161 A1 3/2014 Elenbaas et al.
2014/0138016 A1 5/2014 Takaoka
2014/0167328 A1 * 6/2014 Petzel ................ B29C 35/0261 264/442
2014/0354029 A1 12/2014 Takaoka
2014/0370769 A1 12/2014 Osaki
2014/0378015 A1 12/2014 Osaki
2015/0072107 A1 3/2015 Fujita et al.
2015/0091209 A1 4/2015 Mueller et al.
2015/0183349 A1 7/2015 Oberle et al.
2015/0197056 A1 7/2015 Takaoka
2015/0210192 A1 7/2015 Benson et al.
2015/0219136 A1 8/2015 Koelling
2015/0266263 A1 9/2015 Ichikawa
2015/0272332 A1 10/2015 Noguchi et al.
2015/0274048 A1 10/2015 Mogi et al.
2015/0284894 A1 10/2015 Takaoka
2015/0367583 A1 12/2015 Blot et al.
2016/0009209 A1 1/2016 Cao et al.
2016/0010250 A1 1/2016 Taninaka et al.
2016/0023387 A1 1/2016 Takaoka
2016/0032506 A1 2/2016 Takaoka
2016/0051009 A1 2/2016 Kormann et al.
2016/0052066 A1 2/2016 Chou
2016/0052433 A1 2/2016 Ono et al.
2016/0052435 A1 2/2016 Nakada
2016/0096462 A1 4/2016 Kromm et al.
2016/0122925 A1 5/2016 Shah et al.
2016/0144756 A1 5/2016 Ito et al.
2016/0157628 A1 6/2016 Khambete et al.
2016/0174725 A1 6/2016 Takaoka
2016/0263802 A1 9/2016 Takaoka
2016/0280106 A1 9/2016 Sato et al.
2016/0318428 A1 11/2016 Hugues et al.
2016/0374428 A1 12/2016 Kormann et al.
2017/0043695 A1 2/2017 Kitamoto et al.
2017/0174346 A1 6/2017 Wilson et al.
2017/0181505 A1 6/2017 Burke et al.
2017/0184108 A1 6/2017 Scancarello et al.
2017/0332733 A1 11/2017 Cluckers et al.
2018/0054858 A1 2/2018 Dry
2018/0070736 A1 3/2018 Achten et al.
2018/0086623 A1 3/2018 Takaoka
2018/0147792 A1 5/2018 Kojima et al.
2018/0148312 A1 5/2018 Kojima et al.
2018/0229634 A1 8/2018 Baisch et al.
2018/0332663 A1 11/2018 Lisseman et al.
2019/0002272 A1 1/2019 Kristo et al.
2019/0090656 A1 3/2019 Duncan et al.
2019/0125092 A1 5/2019 Ando et al.
2019/0135199 A1 5/2019 Galan Garcia et al.
2019/0161593 A1 5/2019 Hattori
2019/0232835 A1 8/2019 Murakami et al.
2019/0298072 A1 10/2019 Bhatia et al.
2019/0344691 A1 11/2019 Liau et al.
2019/0351787 A1 11/2019 Lodhia et al.
2019/0357695 A1 11/2019 Achten et al.
2019/0381955 A1 12/2019 Mueller et al.

(56) References Cited

U.S. PATENT DOCUMENTS

| | | | |
|---|---|---|---|
| 2019/0390382 | A1 | 12/2019 | Rong et al. |
| 2020/0017006 | A1 | 1/2020 | Booth et al. |
| 2020/0039399 | A1 | 2/2020 | Oomen et al. |
| 2020/0165122 | A1 | 5/2020 | Salzmann et al. |
| 2020/0180479 | A1 | 6/2020 | Russman et al. |
| 2020/0193221 | A1 | 6/2020 | Aftab et al. |
| 2020/0231428 | A1 | 7/2020 | Migneco et al. |
| 2020/0262323 | A1 | 8/2020 | Robinson et al. |
| 2020/0315365 | A1 | 10/2020 | Kondo et al. |
| 2020/0332445 | A1 | 10/2020 | Taninaka et al. |
| 2020/0360210 | A1 | 11/2020 | Zoni, III et al. |
| 2021/0024155 | A1 | 1/2021 | Primeaux et al. |
| 2021/0046731 | A1 | 2/2021 | Nishikawa et al. |
| 2021/0054549 | A1 | 2/2021 | Takaoka |
| 2021/0074258 | A1 | 3/2021 | Konno et al. |
| 2021/0086670 | A1 | 3/2021 | Kozlowski et al. |
| 2021/0115607 | A1 | 4/2021 | Inoue et al. |
| 2021/0188138 | A1 | 6/2021 | Powell et al. |
| 2021/0221266 | A1 | 7/2021 | Kozlowski et al. |
| 2021/0291421 | A1 | 9/2021 | Nattrass et al. |
| 2021/0299995 | A1 | 9/2021 | Sieradzki et al. |
| 2022/0017003 | A1 | 1/2022 | Carraro et al. |
| 2022/0017718 | A1 | 1/2022 | Martin et al. |
| 2022/0025561 | A1 | 1/2022 | Yasui et al. |
| 2022/0169554 | A1 | 6/2022 | Du Moulinet et al. |
| 2022/0178057 | A1 | 6/2022 | Maschino et al. |
| 2022/0314851 | A1 | 10/2022 | Pereny et al. |
| 2022/0314854 | A1 | 10/2022 | Pereny et al. |
| 2022/0370749 | A1 | 11/2022 | Dunn et al. |
| 2022/0402416 | A1 | 12/2022 | Yang et al. |
| 2022/0410775 | A1 | 12/2022 | Aoki et al. |
| 2023/0028451 | A1 | 1/2023 | Gastaldi |
| 2023/0173964 | A1 | 6/2023 | Webster et al. |
| 2023/0191678 | A1 | 6/2023 | Blair et al. |
| 2023/0191680 | A1 | 6/2023 | Blair et al. |
| 2023/0322135 | A1 | 10/2023 | Hallock et al. |
| 2023/0322136 | A1 | 10/2023 | Wang et al. |
| 2024/0010108 | A1 | 1/2024 | Hallock et al. |
| 2024/0066824 | A1 | 2/2024 | Cluet et al. |
| 2024/0133078 | A1 | 4/2024 | Hirano et al. |

FOREIGN PATENT DOCUMENTS

| | | | |
|---|---|---|---|
| BR | 112014004632 | B1 | 4/2021 |
| BR | 112014001603 | A2 | 8/2021 |
| BR | 112013020474 | B1 | 9/2021 |
| BR | 112017016357 | B1 | 3/2022 |
| CA | 3102262 | A1 | 12/2019 |
| CN | 100467696 | C | 3/2009 |
| CN | 1859862 | B | 4/2010 |
| CN | 202509164 | U | 10/2012 |
| CN | 105026632 | A | 11/2015 |
| CN | 102959151 | B | 4/2016 |
| CN | 105612279 | A | 5/2016 |
| CN | 103328711 | B | 6/2016 |
| CN | 104024511 | B | 8/2016 |
| CN | 104582538 | B | 9/2016 |
| CN | 104080959 | B | 2/2017 |
| CN | 106387295 | A | 2/2017 |
| CN | 106458070 | A | 2/2017 |
| CN | 103998668 | B | 3/2017 |
| CN | 103827376 | B | 6/2017 |
| CN | 105683434 | B | 7/2017 |
| CN | 104285003 | B | 9/2017 |
| CN | 105705695 | B | 1/2018 |
| CN | 207140883 | U | 3/2018 |
| CN | 208484779 | U | 2/2019 |
| CN | 109680413 | A | 4/2019 |
| CN | 107614238 | B | 2/2020 |
| CN | 111038431 | A | 4/2020 |
| CN | 107208339 | B | 6/2020 |
| CN | 107532357 | B | 8/2020 |
| CN | 106231959 | B | 10/2020 |
| CN | 111989430 | A | 11/2020 |
| CN | 112020578 | A | 12/2020 |
| CN | 107708493 | B | 1/2021 |
| CN | 112192846 | A | 1/2021 |
| CN | 107208340 | B | 2/2021 |
| CN | 109552123 | A | 7/2021 |
| CN | 109552123 | B | 7/2021 |
| CN | 113166995 | A | 7/2021 |
| CN | 213618701 | U | 7/2021 |
| CN | 215203369 | U | 12/2021 |
| CN | 113930900 | A | 1/2022 |
| CN | 109680412 | B | 2/2022 |
| CN | 115139881 | A | 10/2022 |
| CN | 117043246 | A | 11/2023 |
| DE | 2240769 | A1 | 3/1973 |
| DE | 2534054 | A1 | 2/1976 |
| DE | 2626748 | A1 | 2/1979 |
| DE | 2626748 | C3 | 10/1979 |
| DE | 3127303 | A1 | 1/1983 |
| DE | 3037834 | C2 | 5/1987 |
| DE | 3690196 | C1 | 10/1989 |
| DE | 3920529 | C1 | 8/1990 |
| DE | 4214389 | A1 | 4/1992 |
| DE | 29822649 | U1 | 4/1999 |
| DE | 102004053133 | A1 | 5/2006 |
| DE | 202006017670 | U1 | 7/2007 |
| DE | 102006020306 | A1 | 11/2007 |
| DE | 102007027496 | B4 | 1/2008 |
| DE | 102008033468 | A1 | 2/2009 |
| DE | 112013005643 | A1 | 8/2015 |
| DE | 112013005643 | T5 | 8/2015 |
| DE | 202018104691 | U1 | 11/2019 |
| DE | 112019002208 | T5 | 1/2021 |
| DE | 102020210092 | A1 | 3/2021 |
| DE | 102020127913 | A | 6/2021 |
| DE | 102022107559 | A1 | 10/2022 |
| DK | 1832675 | T3 | 6/2013 |
| DK | 2772576 | T3 | 5/2015 |
| DK | 3255192 | T3 | 3/2020 |
| DK | 202370420 | A1 | 10/2023 |
| DK | 202370025 | A1 | 2/2024 |
| DK | 202370426 | A1 | 8/2024 |
| EP | 0240388 | A2 | 10/1987 |
| EP | 0145603 | B1 | 4/1988 |
| EP | 0370991 | A2 | 5/1990 |
| EP | 0392568 | A1 | 10/1990 |
| EP | 805064 | A2 | 11/1997 |
| EP | 0890430 | A2 | 1/1999 |
| EP | 0894885 | A2 | 2/1999 |
| EP | 0926302 | A2 | 6/1999 |
| EP | 1082480 | A1 | 3/2001 |
| EP | 0894885 | B1 | 11/2002 |
| EP | 1586687 | A1 | 10/2005 |
| EP | 1270787 | B1 | 6/2010 |
| EP | 2230132 | A1 | 9/2010 |
| EP | 1858944 | B1 | 7/2011 |
| EP | 2532502 | A1 | 12/2012 |
| EP | 2565304 | A1 | 3/2013 |
| EP | 1832675 | B1 | 4/2013 |
| EP | 1683446 | B1 | 7/2013 |
| EP | 2653598 | A1 | 10/2013 |
| EP | 2774807 | A2 | 9/2014 |
| EP | 2489770 | B1 | 1/2015 |
| EP | 2772576 | B1 | 4/2015 |
| EP | 2653598 | B1 | 7/2016 |
| EP | 3210487 | A1 | 8/2017 |
| EP | 2792776 | B1 | 10/2017 |
| EP | 2792775 | B1 | 11/2017 |
| EP | 2848721 | B1 | 1/2018 |
| EP | 3305500 | A1 | 4/2018 |
| EP | 2751312 | B1 | 7/2018 |
| EP | 3064627 | B1 | 8/2018 |
| EP | 3064628 | B1 | 8/2018 |
| EP | 2894246 | B1 | 10/2018 |
| EP | 2966206 | B1 | 11/2018 |
| EP | 3256632 | B1 | 3/2019 |
| EP | 3255192 | B1 | 1/2020 |
| EP | 3779017 | A1 | 2/2021 |
| EP | 3826820 | A1 | 6/2021 |
| EP | 3889332 | A1 | 10/2021 |
| EP | 3610760 | B1 | 11/2021 |

(56) References Cited

FOREIGN PATENT DOCUMENTS

EP 3974572 A1 3/2022
EP 4461166 A1 11/2024
ES 2335962 A1 4/2010
ES 2335962 B1 4/2010
ES 2346180 T3 10/2010
FR 2432108 A1 2/1980
FR 2486922 A3 1/1982
FR 2596626 A1 10/1987
FR 2675440 B1 12/1993
FR 2850260 A1 7/2004
FR 3063461 B1 3/2019
FR 3109753 A1 11/2021
FR 3109753 B1 11/2021
GB 721866 A 1/1955
GB 1009799 A 10/1964
GB 2275695 A 9/1994
GB 2576141 A 2/2020
GB 2577591 B 4/2021
GB 2589497 B 11/2021
GB 2607058 A 11/2022
GB 2628886 A 10/2024
IN 201717042989 A 3/2018
IN 336480 B 5/2020
IN 202047045846 A 10/2020
IN 351780 B 11/2020
IN 382056 B 11/2021
IN 202117027707 A 11/2021
JP S52105392 A 9/1977
JP S556515 A 1/1980
JP H04286627 A 10/1992
JP H0861414 A 3/1996
JP H10128890 A 10/1996
JP H10248685 A 9/1998
JP H115282 A 1/1999
JP 2000248455 A 2/1999
JP H1148275 A 2/1999
JP H11123757 A 5/1999
JP 2001061607 A 8/1999
JP H11350326 A 12/1999
JP 2000004993 A 1/2000
JP 2000509335 A 7/2000
JP 2001046185 A 2/2001
JP 2001055719 A 2/2001
JP 2001061612 A 3/2001
JP 2001070106 A 3/2001
JP 2003012905 A 7/2001
JP 2001310378 A 11/2001
JP 2001329631 A 11/2001
JP 2001341248 A * 12/2001 ........... B32B 27/065
JP 2002084894 A 3/2002
JP 2002087879 A 3/2002
JP 2002088636 A 3/2002
JP 2003250667 A 9/2003
JP 2003251089 A 9/2003
JP 2003268668 A 9/2003
JP 2004202858 A 7/2004
JP 3589307 B2 11/2004
JP 3686690 B2 8/2005
JP 3686692 B2 8/2005
JP 2006006924 A 1/2006
JP 2006200117 A 8/2006
JP 2006200119 A 8/2006
JP 2006200120 A 8/2006
JP 2007098013 A 4/2007
JP 4181878 B2 11/2008
JP 2009090089 A 4/2009
JP 4347647 B2 10/2009
JP 4350285 B2 10/2009
JP 4350286 B2 10/2009
JP 4350287 B2 10/2009
JP 2010524569 A 7/2010
JP 2012171360 A 2/2011
JP 2011045424 A 3/2011
JP 2011152779 A 3/2011
JP 2011177413 A 9/2011
JP 4835150 B2 12/2011
JP 4907991 B2 4/2012
JP 2012115515 A 6/2012
JP 5165809 B1 3/2013
JP 2013091862 A 5/2013
JP 5339107 B1 11/2013
JP 2015119825 A 12/2013
JP 5418741 B1 2/2014
JP 5454733 B2 3/2014
JP 5454734 B2 3/2014
JP 2014064767 A 4/2014
JP 5532178 B1 6/2014
JP 5532179 B1 6/2014
JP 2014104050 A 6/2014
JP 5569641 B1 8/2014
JP 2015067934 A 4/2015
JP 2015205611 A 11/2015
JP 5868964 B2 2/2016
JP 2016028900 A 3/2016
JP 2016036972 A 3/2016
JP 5909581 B1 4/2016
JP 5976511 B2 8/2016
JP 5986584 B2 9/2016
JP 5990194 B2 9/2016
JP 2016189879 A 11/2016
JP 6182249 B2 8/2017
JP 2017150100 A 8/2017
JP 6228278 B2 11/2017
JP 2017226230 A 12/2017
JP 2018500990 A 1/2018
JP 2018027163 A 2/2018
JP 6294140 B2 3/2018
JP WO2016189879 A1 3/2018
JP 6311918 B2 4/2018
JP 6311919 B2 4/2018
JP 6318643 B2 5/2018
JP 6347492 B2 6/2018
JP 2020127523 A 2/2019
JP 6527602 B2 6/2019
JP 6566900 B2 8/2019
JP 2019173217 A 10/2019
JP 2019173218 A 10/2019
JP 2019189972 A 10/2019
JP 2019210565 A 12/2019
JP 6661666 B2 3/2020
JP 2020045589 A 3/2020
JP 2020090648 A 6/2020
JP 6725823 B2 7/2020
JP 2020156629 A 10/2020
JP 6786500 B2 11/2020
JP 2020192164 A 12/2020
JP 6819297 B2 1/2021
JP 2021045365 A 3/2021
JP 6863537 B2 4/2021
JP 6909823 B2 7/2021
JP WO2020090648 A1 10/2021
JP 7002010 B2 2/2022
JP 7158968 B2 10/2022
KR 200207612 Y1 1/2001
KR 20090035561 A 4/2009
KR 101141773 B1 5/2012
KR 101250622 B1 4/2013
KR 20130067823 A 6/2013
KR 20170017488 A 2/2017
KR 101722929 B1 4/2017
KR 101722932 B1 4/2017
KR 101756629 B1 7/2017
KR 20170107554 A 9/2017
KR 20170117085 A 10/2017
KR 101829235 B1 2/2018
KR 101928730 B1 3/2019
KR 101961514 B1 3/2019
KR 101983204 B1 5/2019
KR 102002393 B1 7/2019
KR 102083055 B1 2/2020
KR 102137446 B1 7/2020
KR 102148214 B1 8/2020
KR 102227060 B1 3/2021
KR 20210076130 A 6/2021

(56) References Cited

FOREIGN PATENT DOCUMENTS

| | | | |
|---|---|---|---|
| KR | 20220034241 | A | 3/2022 |
| NL | 1032699 | C2 | 4/2008 |
| WO | 1992018224 | A1 | 10/1992 |
| WO | 1995015768 | A1 | 6/1995 |
| WO | 1997002377 | A1 | 1/1997 |
| WO | 2000047801 | A1 | 8/2000 |
| WO | 2000071382 | A1 | 11/2000 |
| WO | 01068967 | A1 | 9/2001 |
| WO | 2002061217 | A1 | 8/2002 |
| WO | 2004014690 | A | 2/2004 |
| WO | 2004063450 | A1 | 7/2004 |
| WO | 2005030011 | A1 | 4/2005 |
| WO | 2006068120 | A1 | 6/2006 |
| WO | 2006101929 | A2 | 9/2006 |
| WO | 2008016770 | A1 | 2/2008 |
| WO | 2009092153 | A1 | 7/2009 |
| WO | 2010048515 | A1 | 4/2010 |
| WO | 2010068854 | A1 | 6/2010 |
| WO | 2010090093 | A1 | 8/2010 |
| WO | 2011102951 | A1 | 8/2011 |
| WO | 2012035736 | A1 | 3/2012 |
| WO | 2012157289 | A1 | 11/2012 |
| WO | 2012167950 | A1 | 12/2012 |
| WO | 2013030400 | A1 | 3/2013 |
| WO | 2013088736 | A1 | 6/2013 |
| WO | 2013088737 | A1 | 6/2013 |
| WO | 2013168699 | A1 | 11/2013 |
| WO | 2014038151 | A1 | 3/2014 |
| WO | 2014075198 | A1 | 5/2014 |
| WO | 2014080614 | A1 | 5/2014 |
| WO | 2014132484 | A1 | 9/2014 |
| WO | 2015050134 | A1 | 4/2015 |
| WO | 2015064523 | A1 | 5/2015 |
| WO | 2015064557 | A1 | 5/2015 |
| WO | 2015125497 | A1 | 8/2015 |
| WO | 2015163188 | A1 | 10/2015 |
| WO | 2016125766 | A1 | 8/2016 |
| WO | 2016130602 | A1 | 8/2016 |
| WO | 2016177425 | A1 | 11/2016 |
| WO | 2016189879 | A1 | 12/2016 |
| WO | 2017119157 | A1 | 7/2017 |
| WO | 2017122370 | A1 | 7/2017 |
| WO | 2017199474 | A1 | 11/2017 |
| WO | 2018068451 | A1 | 4/2018 |
| WO | 2018172385 | A1 | 9/2018 |
| WO | 2019036559 | A1 | 2/2019 |
| WO | 2019166691 | A1 | 9/2019 |
| WO | 2019188090 | A1 | 10/2019 |
| WO | 2019230304 | A1 | 12/2019 |
| WO | 2020021263 | A1 | 1/2020 |
| WO | 2020045589 | A1 | 3/2020 |
| WO | 2020090648 | A1 | 5/2020 |
| WO | 2020111110 | A1 | 6/2020 |
| WO | 2020116327 | a1 | 6/2020 |
| WO | 2020116327 | A1 | 6/2020 |
| WO | 2020245670 | A1 | 12/2020 |
| WO | 2021074601 | A1 | 4/2021 |
| WO | 2021122937 | A1 | 6/2021 |
| WO | 2021141601 | A1 | 7/2021 |
| WO | 2022097435 | A1 | 5/2022 |
| WO | 2023071240 | A1 | 5/2023 |
| WO | 2023101995 | A2 | 6/2023 |
| WO | 2023122018 | A2 | 6/2023 |
| WO | 2023132308 | A1 | 7/2023 |
| WO | 2023172483 | A1 | 9/2023 |
| WO | 2023204905 | A1 | 10/2023 |
| WO | 2024136943 | A1 | 10/2023 |
| WO | 2023220261 | A1 | 11/2023 |
| WO | 2023244721 | A1 | 12/2023 |
| WO | 2023250026 | A1 | 12/2023 |
| WO | 2024006134 | A1 | 1/2024 |
| WO | 2024006143 | A1 | 1/2024 |
| WO | 2024097012 | A1 | 5/2024 |

OTHER PUBLICATIONS https://www.toyobo-global.com/seihin/breathair/breathair_youto.htm, Applications, Sep. 10, 2019, 5 pages.

https://www.toyobo-global.com/seihin/breathair_youto_htm, Toyobo Breathair, Cushion Materials, 1996-2013, 3 pages.

https://www.youtube.com/watch?v=eFiPBu_fBe4, The Making of a Newton Wovenaire Crib Mattress—YouTube, 3 Pages, Apr. 21, 2016.

www.newtonbaby.com pages design, Borninwater, designed to breathe, Jan. 28, 2021, 11 pages.

http://airstring.com, Introducing Airstring The Future of Cushioning, 2016, 13 pages.

Denmark Examination Report for Application No. PA 2023 70426, dated Dec. 1, 2023, 10 pages.

International Search Report and Written Opinion for Application No. PCT/US23/34906, dated Jan. 22, 2024, 9 pages.

https://www.youtube.com/watch2v=eFiPBu fBe4, The Making of a Newton Wovenaire Crib Mattress, Apr. 21, 2016, 3 pages.

* cited by examiner

CUSHION ASSEMBLY

TECHNICAL FIELD

Various embodiments relate to cushions formed from a unitary mesh of expanded thermoplastic resin strands.

DETAILED DESCRIPTION

Figures 1, 2, 3, 4:
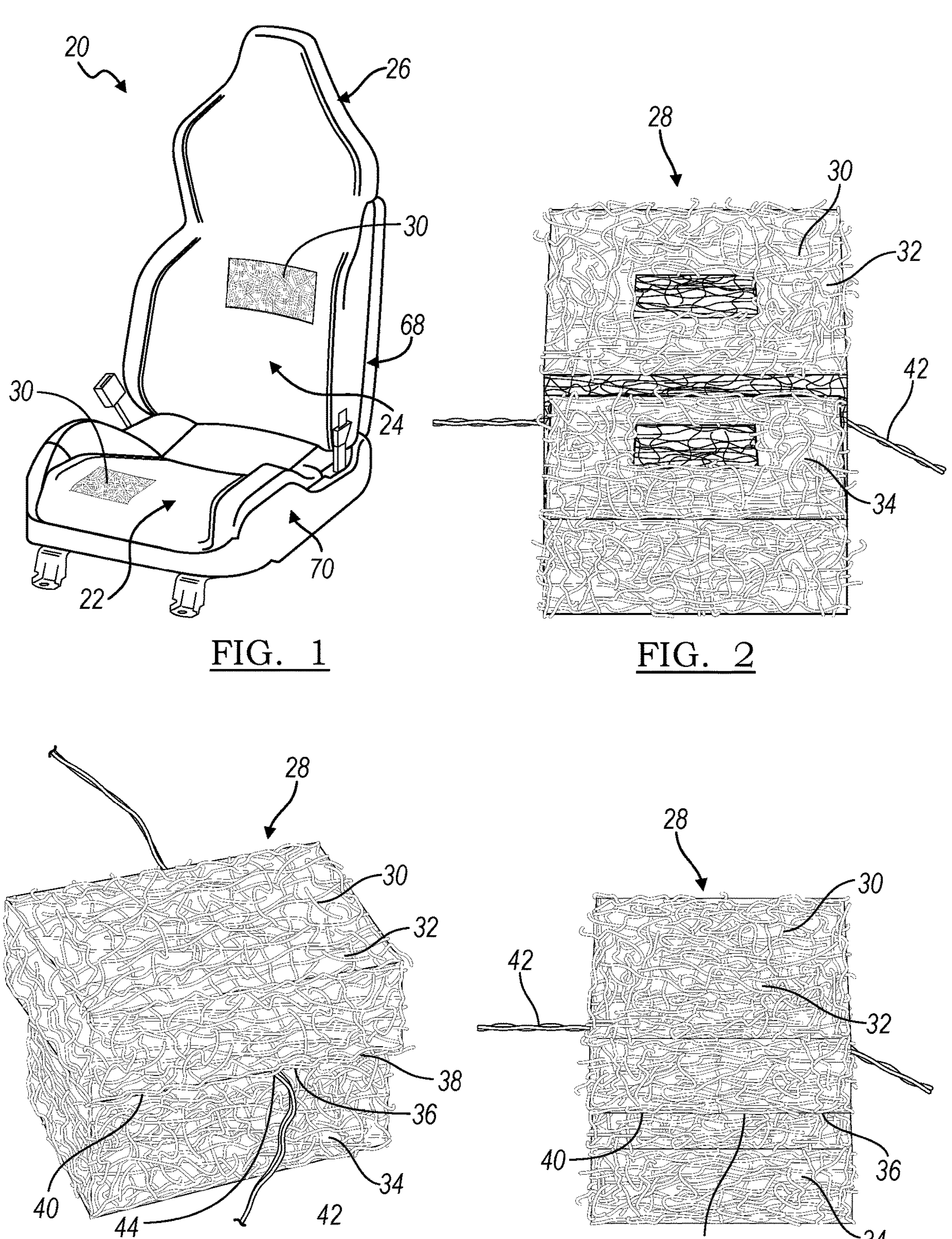
FIG. 1 is a front perspective view of a seat assembly according to an embodiment.
FIG. 2 is a top perspective view of a cushion assembly of the seat assembly of FIG. 1, according to an embodiment.
FIG. 3 is a side perspective view of the cushion assembly of FIG. 2.
FIG. 4 is a front perspective view of the cushion assembly of FIG. 2.
Figures 5, 6, 7, 8:
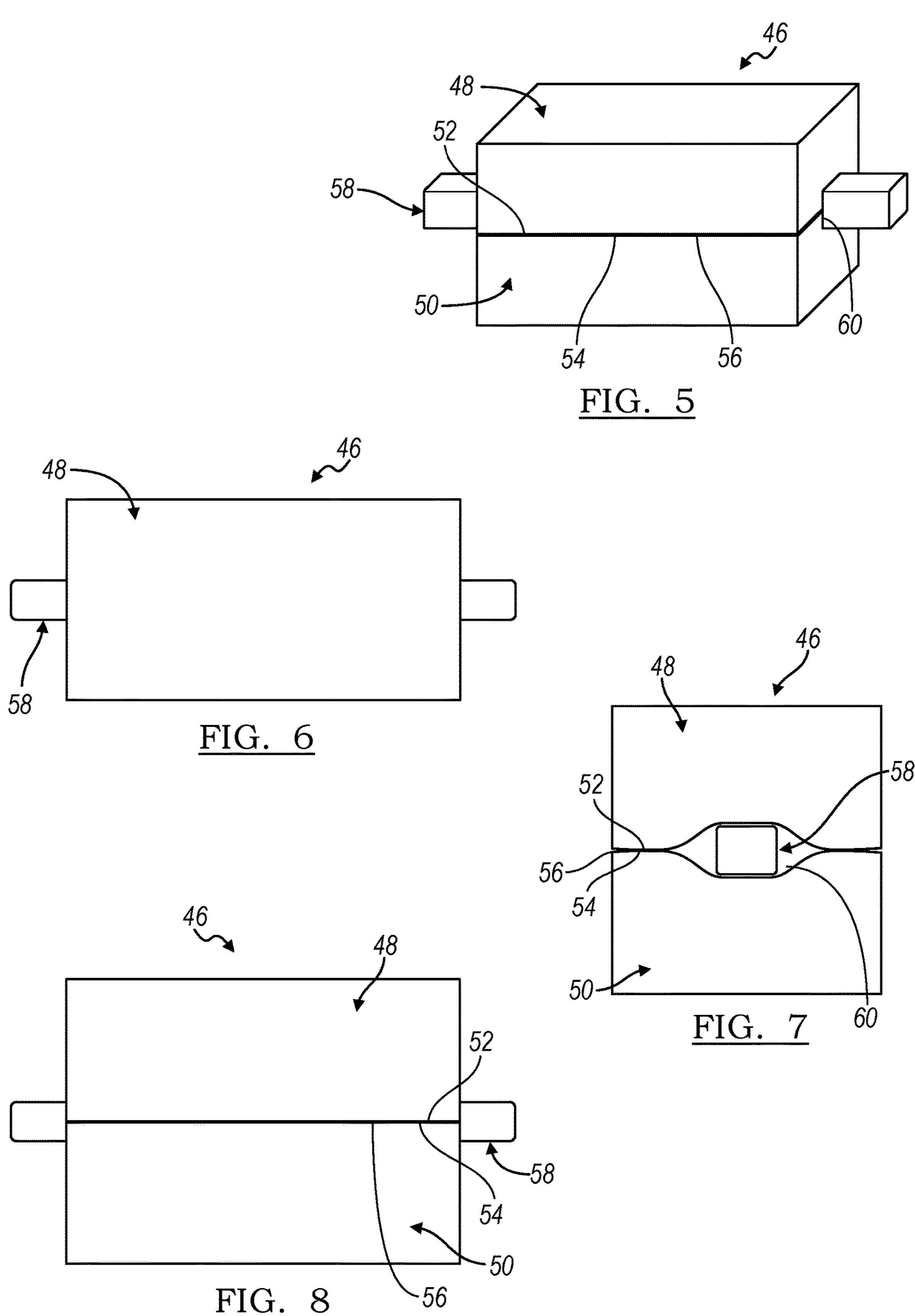
FIG. 5 is a front perspective view of a cushion assembly of the seat assembly of FIG. 1, according to an embodiment.
FIG. 6 is a top view of the cushion assembly of FIG. 5.
FIG. 7 is a side elevation view of the cushion assembly of FIG. 5.
FIG. 8 is a front view of the cushion assembly of FIG. 5.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting." depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates a seat assembly 20 as a vehicle seat assembly 20 according to an embodiment. Although the vehicle seat assembly 20 is illustrated and described, any seat assembly 20 may be employed. The seat assembly 20 may be utilized in a land vehicle, aircraft, watercraft, or the like. The seat assembly 20 may also be utilized as an office chair, comfort chair, or the like.

The depicted seat assembly 20 includes a seat bottom cushion 22 to support a pelvis and thighs of a seated occupant. The seat assembly 20 also includes a seat back cushion 24 to support a back and shoulders of the seated occupant. A trim cover 26 is provided over the seat cushions 22, 24 to conceal the cushions 22, 24 and provide a uniform and smooth contact surface for the occupant.

Referring now to FIGS. 2-4, a cushion assembly 28 is illustrated, disassembled from the seat assembly 20. The cushion assembly 28 is formed from a plurality of strands 30 of an extruded, expanded thermoplastic resin as disclosed in Geisler et al., U.S. provisional patent application 63/357,163 filed on Jun. 30, 2022, by Lear Corporation, the disclosure of which is incorporated in its entirety by reference herein.

The cushion assembly 28 is provided by two mesh portions 32, 34 each formed from a unitary, non-foam mesh of thermoplastic resin strands 30. The mesh portions 32, 34 are joined together, at least partially along mating surfaces 36, 38 between the mesh portions 32, 34. A weld 40 is formed at least partially along the mating surfaces 36, 38 of the mesh portions 32, 34. The two mesh portions 32, 34 may be separately formed mesh layers 32, 34, or may be integrally formed as two separate regions 32, 34, that are folded to overlap to be welded.

The mesh portions 32, 34 may each include a skin 36, 38 formed as the mating surfaces 36, 38 of the mesh portions 32, 34 to increase a contact area for the weld 40. The skins 36, 38 may be formed by a denser concentration of the strands 30 at the mating surfaces 36, 38 to form the skins 36, 38 from a denser surface of strands 30. The weld 40 extends along the mesh portions 32, 34 as a seam therebetween, thereby enclosing the mesh portions 32, 34 and/or adjoining the separate segments 32, 34.

The cushion assembly 28 also includes a trim component, such as a tab, or a support, such as a suspension wire 42, enclosed within the cushion assembly 28. The suspension wire 42 is oriented between the mating surfaces 36, 38 of the mesh portions 32, 34. The weld 40 is formed around the suspension wire 42. Due to the flexibility of the mesh portions 32, 34, the mesh portions 32, 34 are compressed around the suspension wire 42, thereby defining a cavity 44 between the mating surfaces 36, 38 to retain the suspension wire 42.

FIGS. 5-8 illustrate a cushion assembly 46 for the seat assembly 20. Similar to the prior embodiment, the cushion assembly 46 is formed from a plurality of strands 30 of an extruded, expanded thermoplastic resin as disclosed in the Geisler et al., U.S. provisional patent application 63/357,163 filed on Jun. 30, 2022, by Lear Corporation.

The cushion assembly 46 is provided by two mesh portions 48, 50 each formed from a unitary, non-foam mesh of thermoplastic resin strands 30. The mesh portions 48, 50 are joined together, at least partially along mating surfaces 52, 54 between the mesh portions 48, 50. A weld 56 is formed at least partially along the mating surfaces 52, 54 of the mesh portions 48, 50. The two mesh portions 48, 50 may be separately formed mesh layers 48, 50, or may be integrally formed as two separate regions 48, 50, that are folded to overlap to be welded.

The mesh portions 48, 50 may each include a skin 52, 54 formed as the mating surfaces 52, 54 of the mesh portions 48, 50 to increase a contact area for the weld 56. The skins 52, 54 may be formed by a denser concentration of the strands 30 at the mating surfaces 52, 54 to form the skins 52, 54 from a denser surface of the strands 30. The weld 56 extends along the mesh portions 48, 50 as a seam therebetween, thereby enclosing the mesh portions 48, 50 and/or adjoining the separate segments 48, 50.

The cushion assembly 46 also includes a trim component, such as a tab or clip, or a support 58, such as a suspension wire, embedded, and enclosed at least partially within the cushion assembly 46. In the depicted embodiment, the support 58 extends out of both longitudinal ends of the cushion assembly 46. However, the support 58 may be a tab extending from one lateral end of the cushion assembly 46.

The support 58 is oriented between the mating surfaces 52, 54 of the mesh portions 48, 50. The weld 56 is formed along both lateral sides of the support 58. Due to the flexibility of the mesh portions 48, 50, the mesh portions 48, 50 are compressed around the support 58, thereby defining a cavity 60 between the mating surfaces 52, 54 to retain the support 58.

Figure 9:
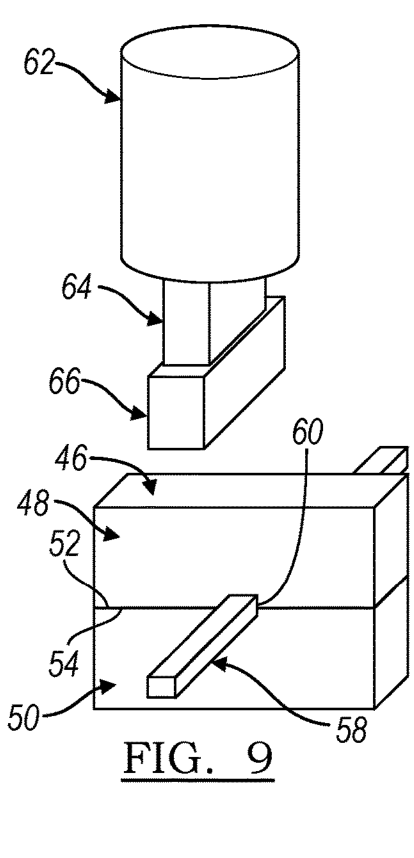
FIG. 9 is perspective view of a manufacturing method according to an embodiment.

FIG. 9 illustrates the mesh portions 48, 50 stacked upon each other with the support 58 therebetween. The mesh portions 48, 50 are presented beneath a welder 62. The welder 62 may be automated or operated manually. According to one embodiment, the welder 62 is an ultrasonic welder 62. Any welder 62 may be employed, such as a heated welder or a friction stir welder. The welder 62 includes a welder arm 64 with a weld tip 66 at a distal end of the welder arm 64.

Figure 10:
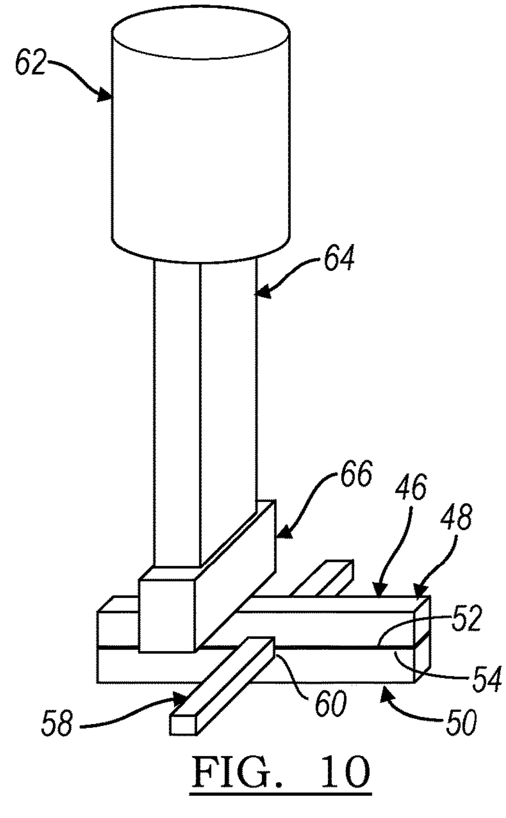
FIG. 10 is another perspective view of the manufacturing method of FIG. 9.

In FIG. 10, the welder arm 64 extends the weld tip 66 into contact with the mesh portion 48 on one lateral side of the support 58, thereby compressing the mesh portions 48, 50 to enhance contact between the mesh portions 48, 50. In FIG. 10, the weld tip 66 is also vibrated ultrasonically under the pressure of the welder arm 64 to create friction between the mesh portions 48, 50 to melt the mesh portions 48, 50 at the mating surfaces 52, 54. The melted mating surfaces 52, 54 of the mesh portions 48, 50 cool to solidify and form the weld 56.

Figure 11:
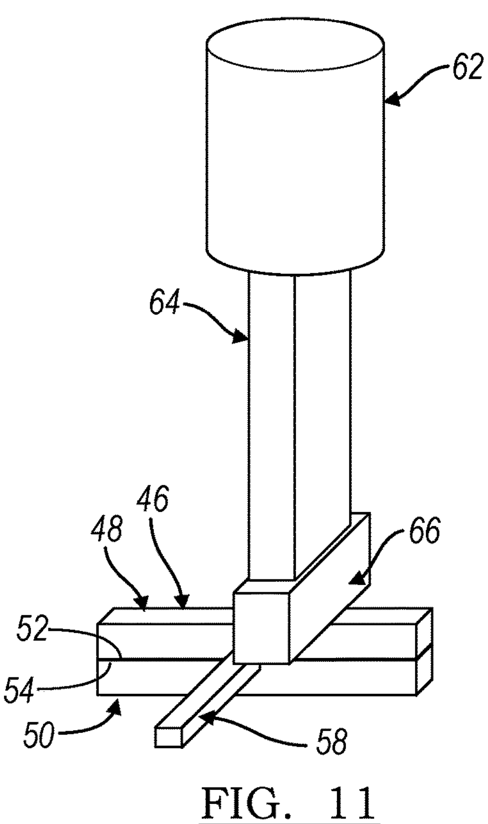
FIG. 11 is another perspective view of the manufacturing method of FIG. 9.

Referring back to FIG. 9, the weld arm 64 is retracted, which permits the mesh portions 48, 50 to expand. Next, FIG. 11 illustrates that the welder 62 is oriented on the other lateral side of the support 58. The cushion assembly 46 may be provided on automation equipment to present the orientation. Alternatively, the welder 62 may be supported upon automation for actuation to the position of FIG. 11.

In FIG. 11, the welder arm 64 extends the weld tip 66 into contact with the mesh portion 48 on the other lateral side of the support 58, thereby compressing the mesh portions 48, 50 to enhance contact between the mesh portions 48, 50. In FIG. 11, the weld tip 66 is also vibrated ultrasonically under the pressure of the welder arm 64 to create friction between the mesh portions 48, 50 to melt the mesh portions 48, 50 at the mating surfaces 52, 54. The melted mating surfaces 52, 54 of the mesh portions 48, 50 cool to solidify and form the weld 56.

Figure 12:
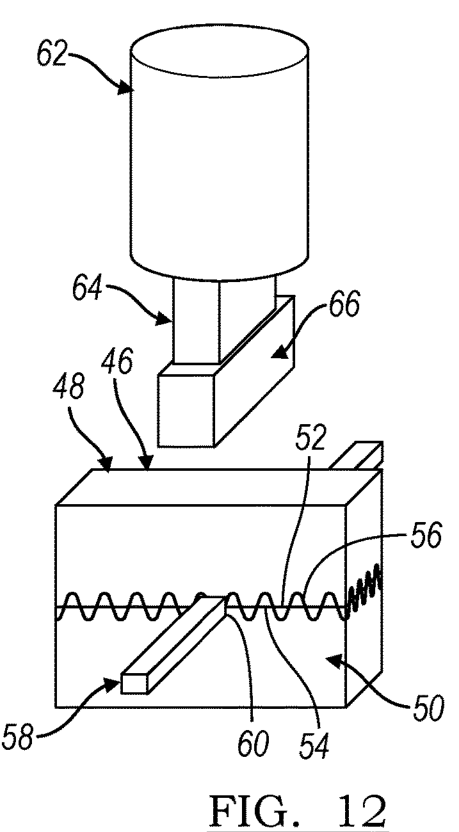
FIG. 12 is another perspective view of the manufacturing method of FIG. 9.

In FIG. 12, the weld arm 64 is retracted to permit the mesh portions 48, 50 to expand as the unitary welded cushion assembly 46. The weld 56 includes a consistent depth, such as a quantity of strands 30 beyond the mating surfaces 52, 54. The quantity of strands 30 may be up to three strands 30, for example. The consistent depth of the weld 56 is more consistent and repeatable than an adhesive, which often drips beyond the mating surfaces, and creates a denser and inconsistent bond beyond the lower mating surface. By omitting adhesives, the cushion assembly 46 is formed from one consistent material, thereby simplifying recyclability. Additionally, the weld 56 provides a flexibility that is less rigid in comparison to a comparable adhesive bond. By welding mesh portions 48, 50 specialized die heads for forming the mesh portions 48, 50 may be avoided or simplified.

The welded cushion assembly 46 provides a lightweight, sustainable comfort solution for seat assemblies 20, thereby reducing vehicle weight, while maintaining occupant support, to reduce cost and enhance fuel efficiency. The strands 30 of the mesh portions 48, 50 provide a reduced surface area for bonding. However, compressing the mesh portions 48, 50 enhances the density and area of the mating surfaces 52, 54 to create the weld 56, which is stronger than adhesives in applicable testing, such as shear resistance. Although two mesh portions 48, 50 are illustrated welded together, any number of mesh portions 48, 50 and any number of welds 56 for any number of supports 58 may be employed to fabricate various cushion assemblies 46. Additionally, supports 58 or trim components 58 of various materials can be utilized in combination with the cushion assembly 46. For example, the support 58 may be a rigid plastic tab or a layered material.

Various parameters of the welding process can be varied for various specifications or applications. For example, the power, voltage, and current of the welder 62 can be adjusted to adjust the performance of the weld 56. Likewise, adjustment of proximity of a point of contact of the weld tip 66 and the mesh portion 48, and a pressure applied to the mesh portions 48, 50 by extension of the weld arm 64 can also vary the weld 56 performance. The time of the weld 56 can also be varied for varying the performance. At the welder tip 66, a frequency of the tip 66 can be varied for a varied weld performance. Additionally, a shape of the welder tip 66 can be adjusted to adjust performance to result in a surface weld, a point weld, or the like.

Various configurations of mating surfaces 52, 54 may also be employed to achieve different mating configurations. For example, both mating surfaces 52, 54 may include a skin layer. Alternatively, one of the mating surfaces 52 may include a skin layer, while the other mating surface 54 includes a less dense surface area of strands 30. In another embodiment, both mating surfaces 52, 54 do not include skin layers. Additionally, the weld 56 can be varied by varying the material of the mesh portions 48, 50, adjusting an area of the mating surfaces 52, 54, or changing a quantity of welds between the mesh portions 48, 50. Various materials may include polyethylene, linear low-density polyethylene, high density polyethylene, polypropylene, polycarbonate, thermoplastic polyester elastomer, acrylonitrile butadiene styrene, polyoxymethylene, or the like.

Referring again to FIG. 1, the cushion assembly 46 is installed to a carrier 68 underneath the trim cover 26 with the seat assembly 20 according to an embodiment. This installation may include attaching the suspension wire 58 to a suspension. Alternatively, the installation may attach the tab 58 directly to the carrier 68. In another embodiment, the cushion assembly 46 is installed to a frame 70 and concealed by the trim cover 26 by attachment of the support 58 directly to the frame 70. Regions of the trim cover 26 are partially removed in FIG. 1 to reveal the strands 30 of the cushion assembly 46.

According to a first aspect, an assembly is provided with a unitary mesh of expanded thermoplastic resin strands with a cavity formed therein. A trim component or a support member is oriented at least partially within the cavity. A weld is formed at least partially along the mesh adjacent to the cavity to retain the trim component or the support member within the cavity.

According to a second aspect, the assembly of the first aspect is provided wherein the weld is formed along mating surfaces of the mesh.

According to a third aspect, the assembly of the second aspect is provided wherein the cavity is formed by compressed regions in the mating surfaces of the mesh.

According to a fourth aspect, the assembly of any of the first aspect to the third aspect is provided wherein the trim component or the support member extend through the mesh.

According to a fifth aspect, the assembly of the fourth aspect is provided wherein the weld is formed along a lateral side of the trim component or the support member.

According to a sixth aspect, the assembly of any of the first aspect to the fifth aspect is provided wherein the trim component is oriented partially in the cavity.

According to a seventh aspect, the assembly of the sixth aspect is provided wherein the trim component is further provided with a tab to attach to a structural member.

According to an eighth aspect, the assembly of any of the first aspect to the seventh aspect is provided, wherein the support member is oriented partially in the cavity.

According to a ninth aspect, the assembly of the eighth aspect is provided wherein the support member is further provided with a suspension wire.

According to a tenth aspect, the assembly of any of the first aspect to the ninth aspect is provided, wherein the mesh is welded without adhesive.

According to an eleventh aspect, the assembly of any of the first aspect to the tenth aspect is provided, wherein the weld is further provided as a consistent quantity of strands.

According to a twelfth aspect, a seat cushion assembly is provided as the assembly of any of the first aspect to the eleventh aspect.

According to a thirteenth aspect, a seat assembly is provided with a seat frame, and a cushion assembly according to the twelfth aspect.

According to a fourteenth aspect, a method is provided by orienting a trim component or a structural member between a first region of a mesh of expanded thermoplastic resin strands and a second region of a mesh of expanded thermoplastic resin strands. The first region is welded to the second region.

According to a fifteenth aspect, the method of the fourteenth aspect is provided with compressing the first region of the mesh and the second region of the mesh to form a cavity for the trim component or the structural member.

According to a sixteenth aspect, the method of the fourteenth aspect or the fifteenth aspect is provided with extending a welder to contact the first region or the second region of the mesh to weld the first region and the second region of the mesh.

According to a seventeenth aspect, the method of the sixteenth aspect is provided with retracting the welder after welding the first region and the second region of the mesh.

According to an eighteenth aspect, the method of any of the fourteenth aspect to the seventeenth aspect is provided with ultrasonic welding the first region and the second region of the mesh.

According to a nineteenth aspect, the method of any of the fourteenth aspect to the eighteenth aspect is provided with welding the first region of the mesh to the second region of the mesh of a unitary layer of the mesh.

According to a twentieth aspect, the method of any of the fourteenth aspect to the nineteenth aspect is provided with stacking the first region from a first layer of the mesh and the second region from a second layer of the mesh prior to welding.

According to a twenty-first aspect, the method of any of the fourteenth aspect to the twentieth aspect is provided with welding the first region of the mesh to the second region of the mesh without adhesives.

According to a twenty-second aspect, the method of any of the fourteenth aspect to the twenty-first aspect is provided with varying power, voltage, current, welder extension distance, or weld frequency of a welder to vary a weld.

According to a twenty-third aspect, a cushion is formed by the method of any of the fourteenth aspect to the twenty-second aspect.

According to a twenty-fourth aspect, a seat cushion is formed by the method of any of the fourteenth aspect to the twenty-second aspect.

According to a twenty-fifth aspect, the method of any of the fourteenth aspect to the twenty-second aspect is provided with installing the welded regions of the mesh into a seat assembly. The trim component or the structural member is attached to a seat frame of the seat assembly.

According to a twenty-sixth aspect, a product is formed by a process by orienting a trim component or a structural member between a first region of a mesh of expanded thermoplastic resin strands and a second region of a mesh of expanded thermoplastic resin strands. The first region is welded to the second region.

While various embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A seat cushion assembly, comprising:

a unitary mesh of thermoplastic strands with a cavity formed therein, the cavity formed by compressing at least a portion of each of at least two regions of the unitary mesh, such that the at least two regions are folded to overlap;

a trim component oriented partially within the cavity and extend through the unitary mesh, wherein the trim component comprises a tab that is adapted to engage with a frame of a seat; and a weld comprising a depth, the weld formed at least partially along mating surfaces of the at least two regions, adjacent to the cavity and along a lateral side of the trim component, wherein the weld is outside the cavity.

2. An assembly, comprising:

a unitary mesh of expanded thermoplastic resin strands comprises at least two regions that are folded to overlap, such that a cavity is formed between the at least two regions;

a trim component or a support member oriented at least partially within the cavity, wherein the trim component or the support member is adapted to engage with a seat frame; and a weld formed at least partially along mating surfaces of the at least two regions of the unitary mesh, adjacent to the cavity to retain the trim component or the support member within the cavity, such that the weld is formed outside the cavity.

3. The assembly of claim 2, wherein the cavity is formed by compressed regions in the mating surfaces of the unitary mesh.

4. The assembly of claim 2, wherein the trim component or the support member extend through the mesh.

5. The assembly of claim 4, wherein the weld is formed along a lateral side of the trim component or the support member.

6. The assembly of claim 2, wherein the trim component is oriented partially in the cavity.

7. The assembly of claim 6, wherein the trim component further comprises a tab adapted to engage with a structural member.

8. The assembly of claim 2, wherein the support member is oriented partially in the cavity.

9. The assembly of claim 8, wherein the support member further comprises a suspension wire.

10. The assembly of claim 2, wherein the mesh is welded without adhesive.

11. The assembly of claim 2, wherein a quantity of strands throughout the weld is consistent.

12. A seat cushion assembly comprising the assembly of claim 2.

13. A seat assembly, comprising:

a seat frame; and a cushion assembly according to claim 12.

* * * * *